(12) United States Patent
Ricketts

(10) Patent No.: US 7,678,284 B2
(45) Date of Patent: Mar. 16, 2010

(54) TERTIARY FILTER

(75) Inventor: Donald D. Ricketts, Monterey, VA (US)

(73) Assignee: Grouse Mountain, Inc., Monterey, VA (US)

( * ) Notice: Subject to any disclaimer, the term of this patent is extended or adjusted under 35 U.S.C. 154(b) by 846 days.

(21) Appl. No.: 11/066,274

(22) Filed: Feb. 28, 2005

(65) Prior Publication Data

US 2005/0139557 A1    Jun. 30, 2005

Related U.S. Application Data

(63) Continuation-in-part of application No. 10/839,166, filed on May 6, 2004, now Pat. No. 7,537,689, which is a continuation-in-part of application No. 10/338,704, filed on Jan. 9, 2003, now abandoned.

(51) Int. Cl.
   *B01D 29/68*    (2006.01)
(52) U.S. Cl. ..................... 210/791; 210/806
(58) Field of Classification Search ............... 210/791, 210/797, 798, 806
   See application file for complete search history.

(56) References Cited

U.S. PATENT DOCUMENTS

| | | |
|---|---|---|
| 2,996,189 A | 8/1961 | Salterbach |
| 3,640,395 A | 2/1972 | Kinney |
| 4,082,664 A * | 4/1978 | Lindstol ................ 210/793 |
| 4,090,965 A | 5/1978 | Fuchs |
| 4,152,265 A | 5/1979 | Meyers |
| 4,412,920 A | 11/1983 | Bolton |
| 4,540,487 A | 9/1985 | Johnson et al. |
| 4,639,315 A | 1/1987 | Fuchs |
| 4,923,600 A | 5/1990 | Krofta |
| 5,354,455 A | 10/1994 | Burklund et al. |
| 5,356,532 A | 10/1994 | Wilkins et al. |
| 5,362,401 A | 11/1994 | Whetsel |
| 5,374,360 A | 12/1994 | Weis |
| 5,409,618 A | 4/1995 | Price |
| 5,635,066 A | 6/1997 | Maurer |
| 5,653,874 A | 8/1997 | Berry, III |
| 5,667,683 A * | 9/1997 | Benian ................ 210/409 |
| 5,876,612 A | 3/1999 | Astrom |
| 5,951,878 A | 9/1999 | Astrom |
| 6,090,298 A | 7/2000 | Weis |
| 6,103,132 A | 8/2000 | Seyfried et al. |
| 6,110,374 A | 8/2000 | Hughes |
| 6,267,879 B1 | 7/2001 | Gil |
| 6,294,098 B1 | 9/2001 | Bergmann |

(Continued)

FOREIGN PATENT DOCUMENTS

DE    39 03 813 C1    6/1990

(Continued)

*Primary Examiner*—Terry K Cecil
(74) *Attorney, Agent, or Firm*—Novak Druce & Quigg LLP

(57) ABSTRACT

A filter cloth of long pile fiber bundles is used as a tertiary filter in a wastewater processing method. The filter may be backwashed by a rotating suction head which does not touch the filter cloth. A combination of countercurrent and horizontal flow dislodges entrained solids from the filter cloth. Mounting of the filter media as modular components permits increased capacity within a single tank while avoiding down time in changeover of filter media.

5 Claims, 11 Drawing Sheets

U.S. PATENT DOCUMENTS

| | | |
|---|---|---|
| 6,447,617 B1 | 9/2002 | Bergmann |
| 6,613,222 B2 | 9/2003 | Mikkelson et al. |
| 6,634,372 B2 | 10/2003 | Bergmann |
| 6,793,823 B2 | 9/2004 | Hubenthal et al. |
| 6,797,186 B2 | 9/2004 | Hubenthal et al. |
| 6,858,140 B2 | 2/2005 | Smith et al. |
| 6,878,295 B2 | 4/2005 | Hubenthal et al. |
| 7,537,689 B2 | 5/2009 | Ricketts |
| 2004/0020003 A1 | 2/2004 | Strauser |
| 2004/0124158 A1* | 7/2004 | Smith et al. ............ 210/791 |
| 2005/0060834 A1 | 3/2005 | Strauser |

FOREIGN PATENT DOCUMENTS

| | | |
|---|---|---|
| DE | 199 37 701 A1 | 1/2001 |
| JP | 55044359 A * | 3/1980 |
| SU | 12 43 768 A1 | 7/1986 |

* cited by examiner

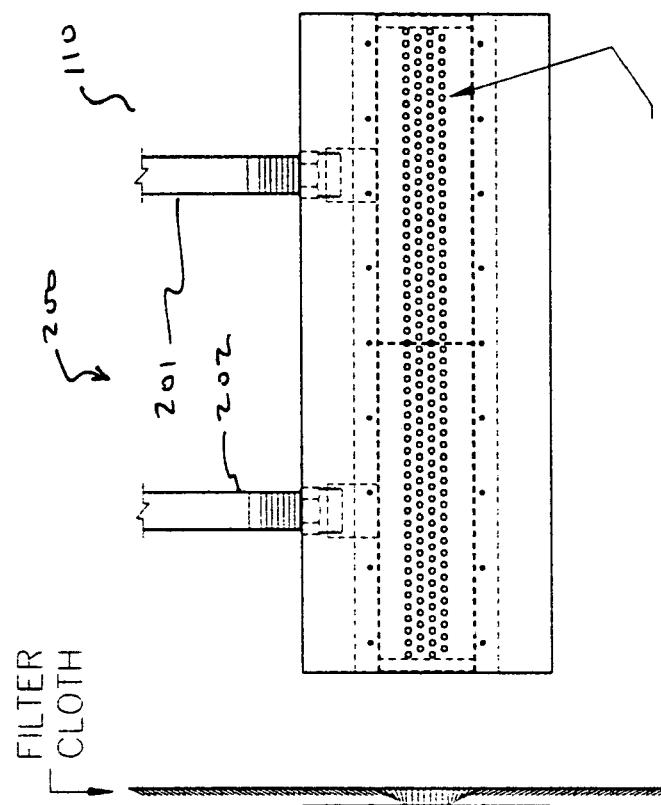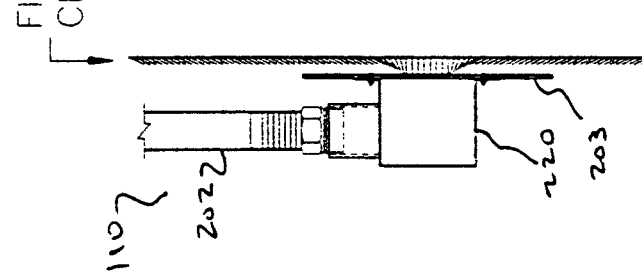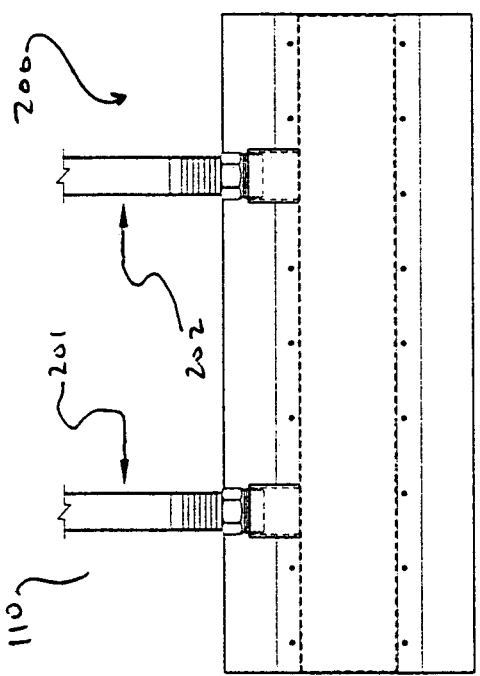

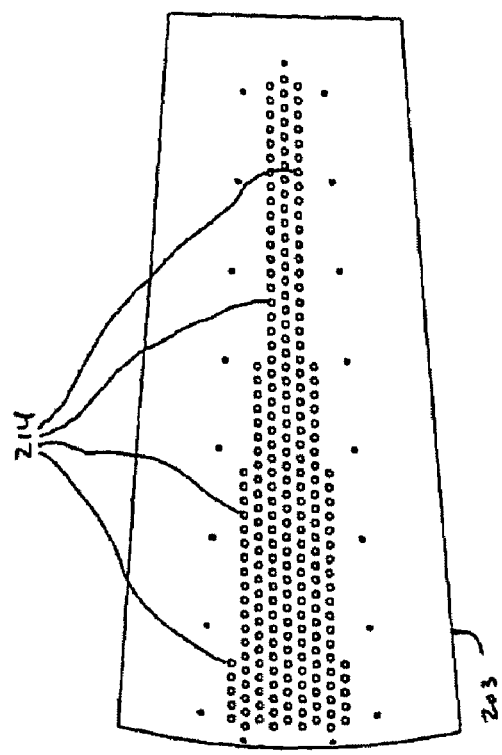
FIG 9
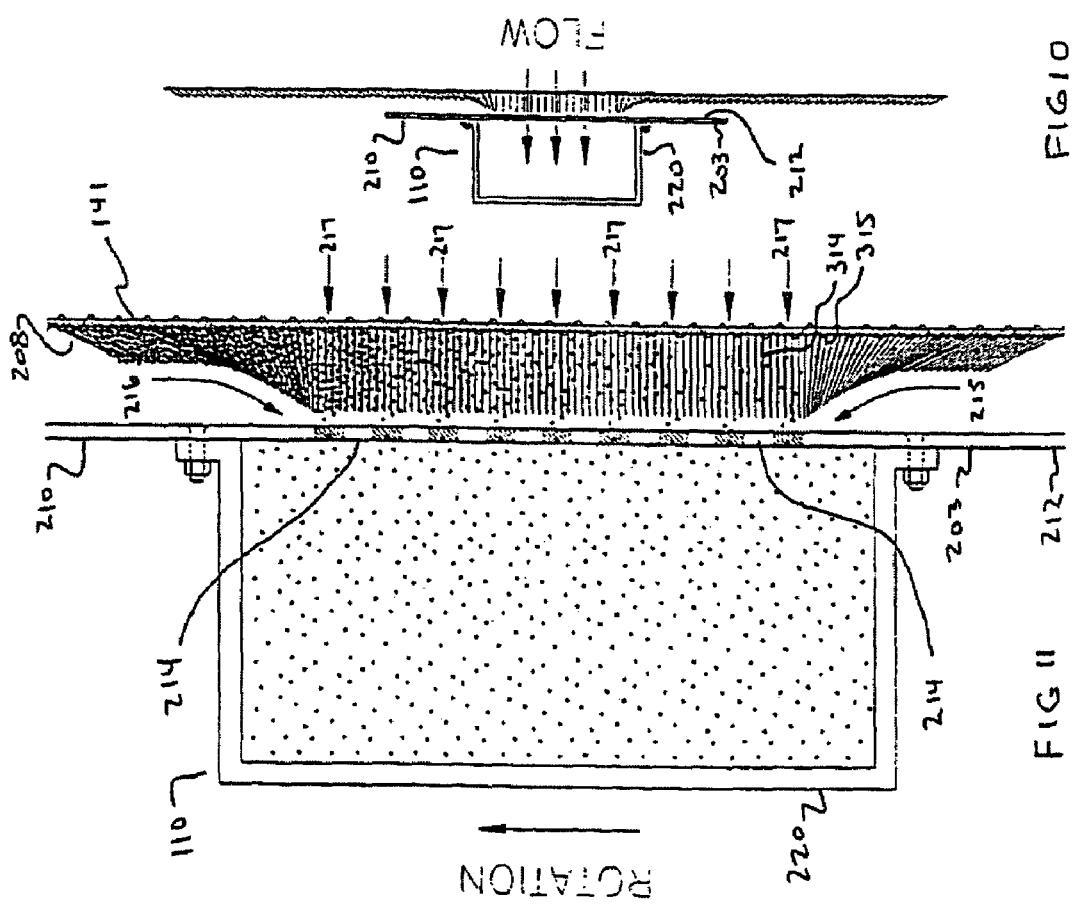
FIG 10
FIG 11

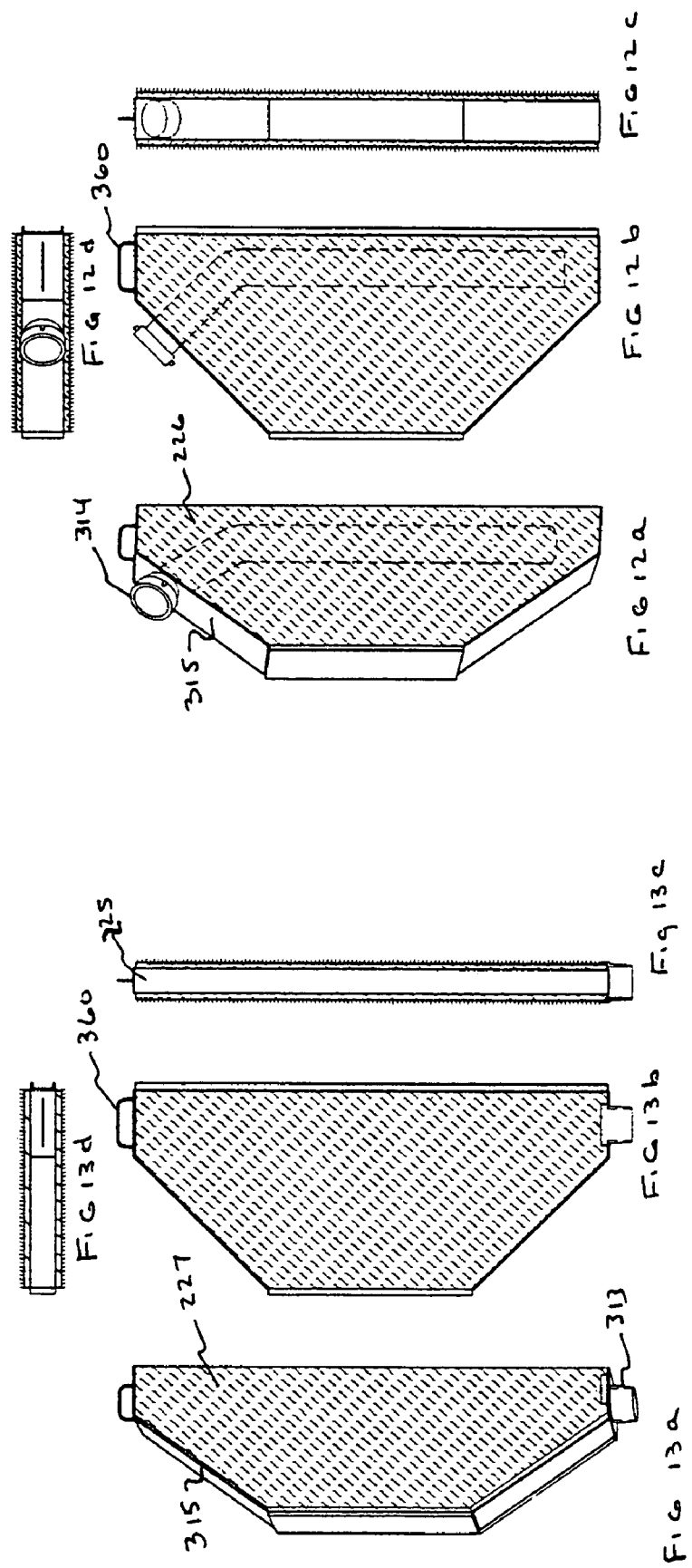

STEP 1

STEP 2

STEP 3

STEP 4

STEP 5

STEP 6

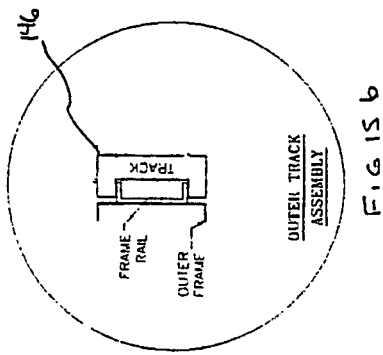
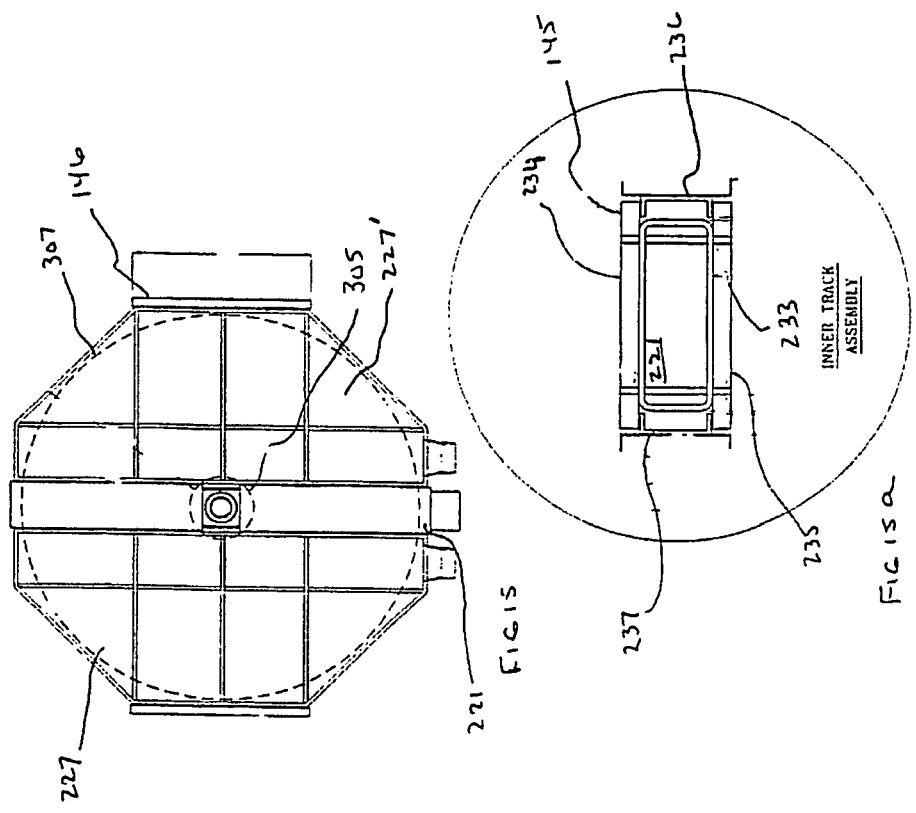

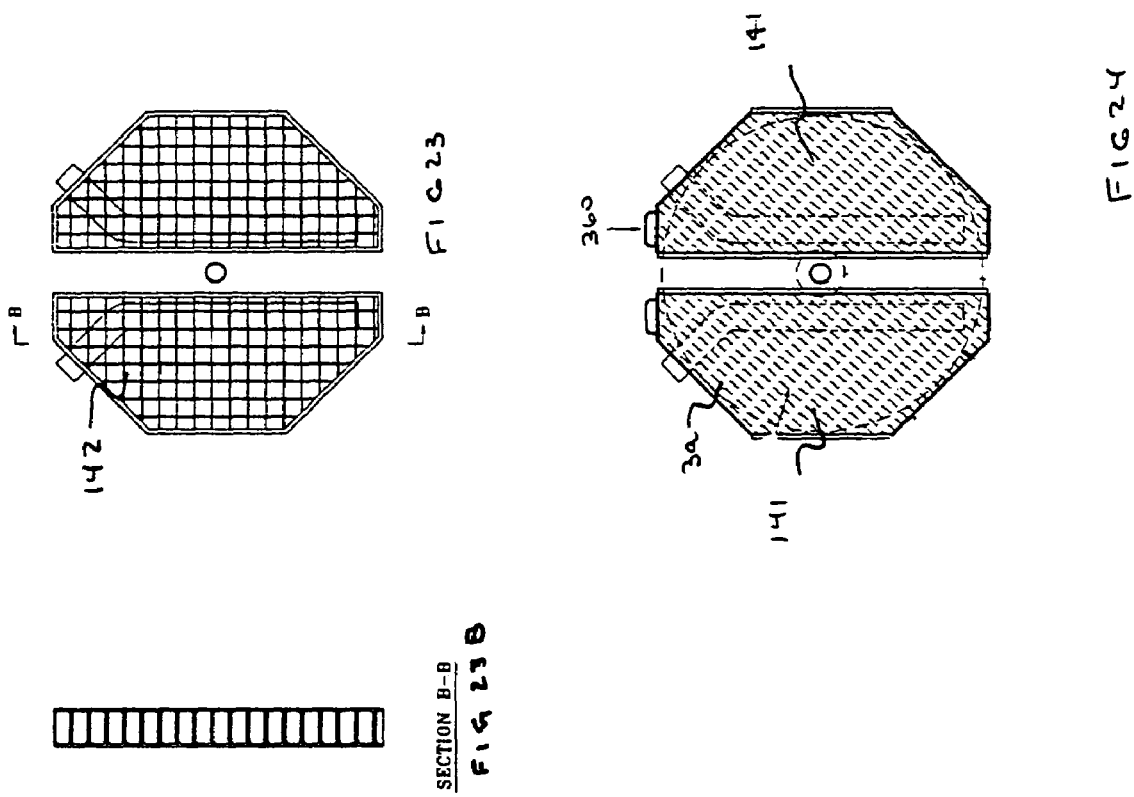

TERTIARY FILTER

CROSS-REFERENCE TO RELATED APPLICATIONS

This application is a continuation-in-part of my previous application Ser. No. 10/839,166, filed May 6, 2004, now U.S. Pat. No. 7,537,689, which, in turn, is a continuation-in-part of Ser. No. 10/338,704, filed Jan. 9, 2003, now abandoned, the entire disclosures of which are herein incorporated by reference.

BACKGROUND OF THE INVENTION

1. Field of the Invention

This invention relates to an apparatus for filtration of material such as suspended solids, from a liquid effluent. The apparatus has particular utility as a filter, particularly as a tertiary filter, in a wastewater treatment method and is particularly useful in reducing the last few ppm (parts per million) of solids in a previously treated wastewater effluent.

2. Background of the Invention

In my previous application, I disclosed the use of felt or pile fabric as a filter medium for a tertiary filter in a wastewater treatment process and apparatus. The use of pile fabric has become of particular interest as a filter media. A pile fabric of particular interest in this invention typically has a long-napped filter cloth or pile comprised of a plurality of fiber bundles of up to about 15 mm in length secured to a woven fiber backing. The fiber bundles, when in use, matt down to form the filter surface. Such a material has good filtering properties, but when used as a filter media, can become occluded or clogged with solid particles removed from a suspension of particles from an effluent such that the particles are retained within, and between, the fiber bundles of the filter media.

It has been previously proposed to backwash a filter media comprising fiber bundles with a suction head which exerts a mechanical pressure on the leading edge of the head with an abrupt release of pressure to cause the fiber bundles to straighten abruptly within a suction slit in the suction head; See, U.S. Pat. No. 6,103,132, the entire disclose of which is herein incorporated by reference.

However, such a process has various drawbacks, including low efficiency of filtering as the suction applied within the slit does not compensate for the varying surface areas of the filter to be backwashed. Furthermore, wear of the filter media by the impingement of the leading (and trailing) edge of the suction head against the filter media may also occur. In addition to wear of the fiber bundles comprising the pile, the mechanical pressure tends to pull the fiber bundles away from the woven fiber backing enlarging the apertures in the backing further resulting in loss of filtering efficiency. Still further, the filter media backing is pulled away from its supporting grid of structural material tending to stretch and misshape the filter media backing resulting in wrinkles in the filter media further impeding the movement of the suction head over the filter media. The filter media, when also subjected to mechanical pressure by the trailing edge of the suction head, also contributes to wear of the filter media. Continued use of the suction head under such conditions degrades the filter media and can pull out fibers or parts of the fiber bundles of the filter media and can even rupture the woven fabric backing resulting in premature failure of the filter media. Of course, upon failure of the filter media, the entire filtering process is disrupted, causing the filtering process to be interrupted and the filter tank in which the filter media of the prior art is contained needs to be drained, and the filter media replaced.

Moreover, the arrangement of the pile filter media in the aforementioned U.S. Pat. No. 6,103,132 is mounted on a rotating shaft, with seals on the shaft about which the filter rotates. Not only do the seals leak resulting in diminution of filter efficiency, but when the filter media fails, through either excessive wear of the fiber bundles, tear out of the fiber bundles from the fabric backing, holes in the fabric backing or, otherwise, the apparatus must be shut down, the tank in which the rotating filter is located must be drained, and the filter wheel disassembled to replace the filter media. Thus, the entire tank is taken out of commission. Furthermore, in the prior art, if one wished to increase capacity of filtering, the entire filter apparatus, including tank, and rotating filter must be duplicated when additional capacity is desired.

The invention avoids all the drawbacks of the prior art filter disclosed in U.S. Pat. No. 6,103,132.

SUMMARY OF THE INVENTION

The present invention is directed to novel filtering process and filter apparatus, including an arrangement of filter media or segments, which media does not rotate. Thus, there is no need for seals about a rotating shaft, as in the prior art, which seals may leak resulting in reduction of filter efficiency.

Moreover, the filter of the invention can be subdivided into segments or modular elements that are easily inserted into, and removable from tracks permitting quick change over of filter segments or modules when replacement becomes inevitable. However, in the invention, such replacement does not require draining of the tank in which the filter sits. In addition, a single tank can be provided or installed with increased capacity achieved merely by inserting additional filters into the same tank. Because there is no cumbersome apparatus to rotate the filter media, tank clearance can be kept to a minimum while satisfying future filter capacity requirements, within a single tank. Nor is the question of overhead clearance an issue as in the prior art. As noted hereinabove, the prior art rotating filters required disassembly after draining the tank. Such disassembly required a human operator to descend into the tank to disassemble the filter media. The present invention permits the filer media to be slid out of its track, without the need to have an operator descend into the tank, and since the media may be segmented, an overhead clearance of only a few feet is necessary to permit an operator access to the filter media. Thus, when the filter apparatus of the invention is housed in a shelter or building, the overhead clearance of the building above the filter apparatus may be as little as two (2)-three (3) feet.

Furthermore, my invention includes both a novel suction head which does not produce physical wear on the pile of the filter media as it does not touch the pile in the method of operating the apparatus according to my invention and a unique method of operating a filtering process.

Moreover, the suction head of the invention has been designed to permit a more uniform application of suction per unit area to the filter media with the suction head being designed to exert the same, or substantially the same, degree of suction over various areas of the filter media being suctioned.

Still further, the method of operating the apparatus, include reversing the rotation of the suction head between passes of the suction head over the filter media, results in more efficient cleaning of entrained solids from the filter media and an alternating orientation of the fiber bundles of the filter media such that the bundles lie in different patterns between passes.

Such as been found to not only extend the life of the individual fibers comprising the fiber bundles, but also improves the efficiency of the backwashing process.

The invention, thus, includes components alone, and in combination with a tank or other effluent holding container; components used in combination with one or more similar components to increase the filtering capacity of a single tank; and processes of manufacturing, installing, operating and servicing these components.

BRIEF DESCRIPTION OF THE DRAWINGS

The invention will now be explained and objects, other than those set forth above, will become apparent when consideration is given to the following detailed description which makes reference to the annexed drawings herein.

FIG. 6 is a face view of one embodiment of the suction head according to the invention;

FIG. 7 is a back view of the embodiment of FIG. 6;

FIG. 8 is an end view of the head of FIGS. 6-7 and also shows the orientation of the head with respect to a filter cloth in one embodiment of the invention;

FIG. 9 is a face view of another embodiment of the suction head according to the invention;

FIG. 10 is an end view of the embodiment of FIG. 9 also showing the overturn of the head relation to the filter cloth in a manner similar to that in FIG. 8;

FIG. 11 is an enlarged view to show details of FIG. 10;

FIGS. 12a-12d are a further embodiment of the invention where filter media, together with a frame for a modular filter assembly (with upper outlet) are shown in perspective, front, right side and top views, respectively;

FIGS. 13a-13d are a further embodiment of the invention where filter media, together with a frame for a modular filter assembly (with lower outlet) are shown in perspective, front, right side and top views, respectively;

FIG. 15 shows an embodiment for mounting the filter assemblies of FIG. 13a;

FIG. 15a is an enlarged top view of the inner track assembly of FIG. 15;

FIG. 15b is an enlarged top view of the outer track assembly of FIG. 15;

FIG. 23 is a front view showing the supporting grid of modular units of FIG. 12a;

FIG. 23B is a cross-section of FIG. 23, along lines B-B of FIG. 23,

FIG. 24 is a front view of FIG. 23, but with the filter cloth attached to the supporting grid;

DESCRIPTION OF THE PREFERRED EMBODIMENTS

Figure 3:
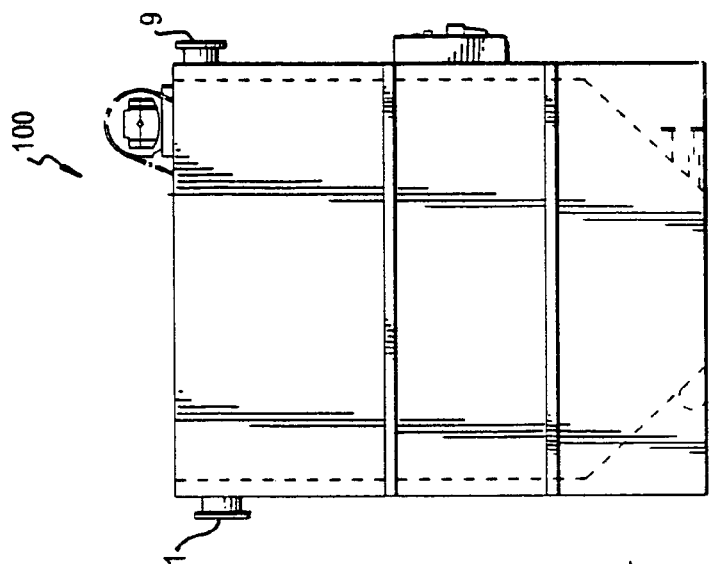
FIG. 3 illustrates a second side view of the filter apparatus shown in FIG. 1.
Figure 2:
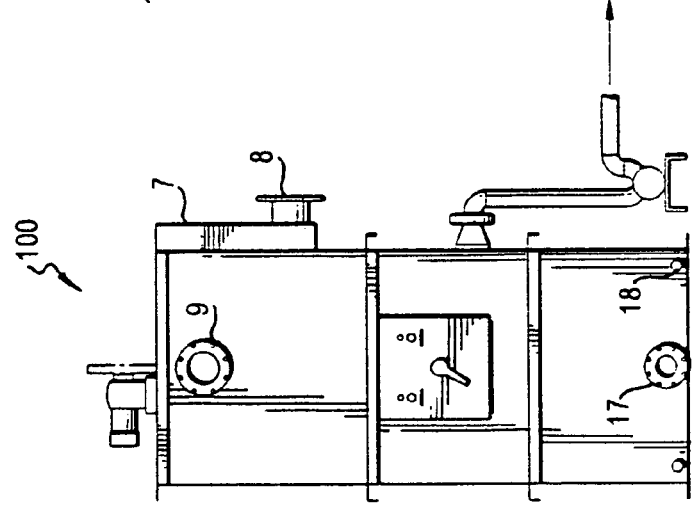
FIG. 2 illustrates a front view of the filter apparatus shown in FIG. 1.
Figure 1:
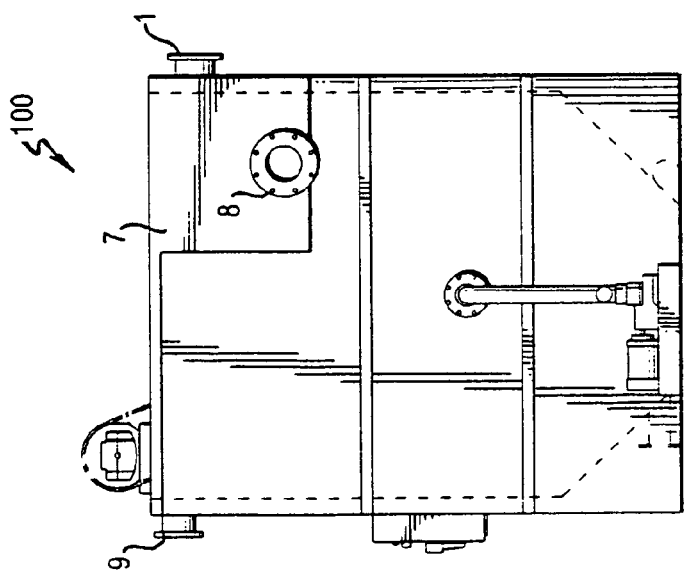
FIG. 1 illustrates a first side view of a filter apparatus according to a first embodiment of the invention.

In one embodiment according to the present invention, a filter apparatus, such as a tertiary filter for a wastewater treatment apparatus, is provided generally shown at 100 in FIG. 1.

Figure 4:
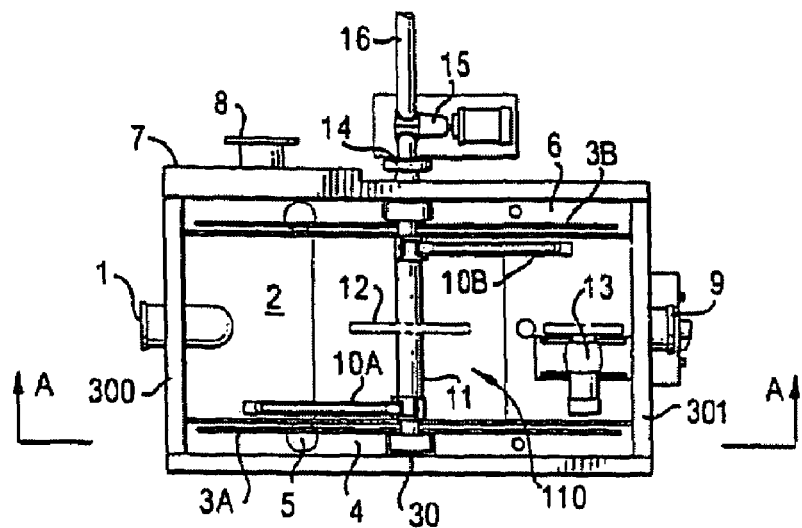
FIG. 4 illustrates a top section view of the filter apparatus shown in FIG. 1 showing the major components thereof.

FIGS. 1-4 show the general features of the filter apparatus 100, which is generally of a box shape comprising several inner compartments. In one embodiment, the liquid to be filtered enters an upper portion of apparatus 100 via an influent pipe 1. Inside the apparatus, the liquid is filtered to remove solids from the liquid. The cleaned liquid then passes through a discharge box 7 (FIG. 2) and is discharged through a discharge port 8. The box shape may be prefabricated from conventional materials, such as sheet metal, which may be shaped and welded into a tank 300. Alternatively, it may be a concrete structure, formed in situ, into which the filter apparatus of the invention is subsequently installed. Tank 300 confines a source of the dirty liquid (not shown) to be filtered in dirty liquid chamber 2 by a plurality of filter assemblies 3A, 3B (FIG. 4). Tank 300 also comprises an over-flow conduit 9, a control panel 20 (FIG. 5) dirty chamber drain 17, a clean chamber drain 18, and other associated apparatus as will be described in connection with FIGS. 4 and 5.

According to one embodiment of the invention, as shown in FIG. 4, apparatus 100 is divided into three compartments, a dirty liquid chamber 2 and two clean liquid chambers 4 and 6. A transfer pipe 5 interconnects the bottom each of the clean water chambers 4 and 6 and allows free flow of liquid between them. Filter assemblies 3A and 3B are mounted inside the apparatus and provide a division between dirty liquid chamber 2 and clean liquid chambers 4 and 6. Dirty liquid entering through pipe 1 fills dirty liquid chamber 2. The water then passes through filter assemblies 3A and 3B which removes solids from the liquid to clean the liquid. The clean liquid then moves into clean water chambers 4 and 6. Clean liquid in clean water chamber 4 moves through transfer pipe 5 to clean water chamber 6. The clean water then exits the apparatus through discharge box 7 and to discharge pipe 8. Wash arms 10A and 10B are provided to respectively backwash filter assemblies 3A and 3B. Motor 13 can, by chain (not shown in FIG. 4) drive sprocket 12. A vacuum pump 15 and associated conduit 16 facilitates the backwashing. Wash arms 10A and 10B can be mounted on an axle 11 supported by journal 30 in tank 300. Swivel joint 14 maintains the vacuum connection.

Figure 25:
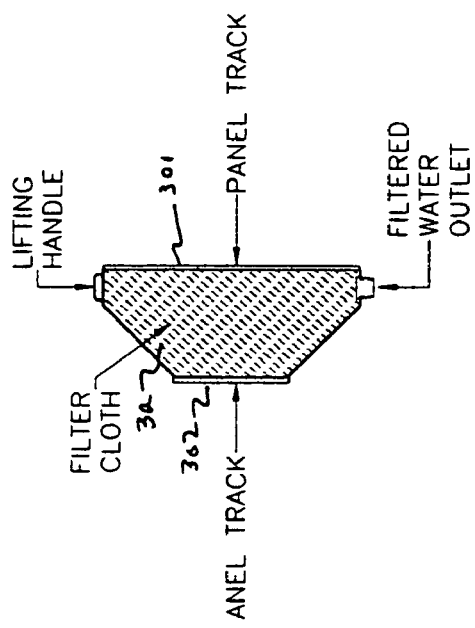
FIG. 25 is a front view of a typical modular panels of the type shown in FIG. 24.

In the alternate embodiment of FIGS. 14a-14f, filter assembly 3A is mounted between inner and outer tracks 145, 146 (FIGS. 15a and 15, respectively) of generally C-shaped configuration surrounding grid 142 (FIG. 23). Grid 142 (with its attached filter cloth 141 (FIG. 24)) is easily removable from the apparatus 100 by withdrawing it in an upward manner along the direction of arrow 143 to remove it from an open top of apparatus 100. It is to be understood that each of the filter cloth 141 and supporting grid can be removed in this manner without draining the dirty water 144 (FIG. 14e) from apparatus 100 nor disassembling the vacuum/suction apparatus including wash arm 10A (FIG. 22) and vacuum head 220 (FIGS. 8, 10, 11), or associated conduits 201, 202. The filter assembly 3a may, itself, be provided with inner track 301 and outer track 302 (FIG. 25) to facilitate mounting in channel 145, 146. Although one embodiment is discussed in connection with the invention, it is to be understood that that discussion is equally applicable to different embodiments of the invention.

Figure 5:
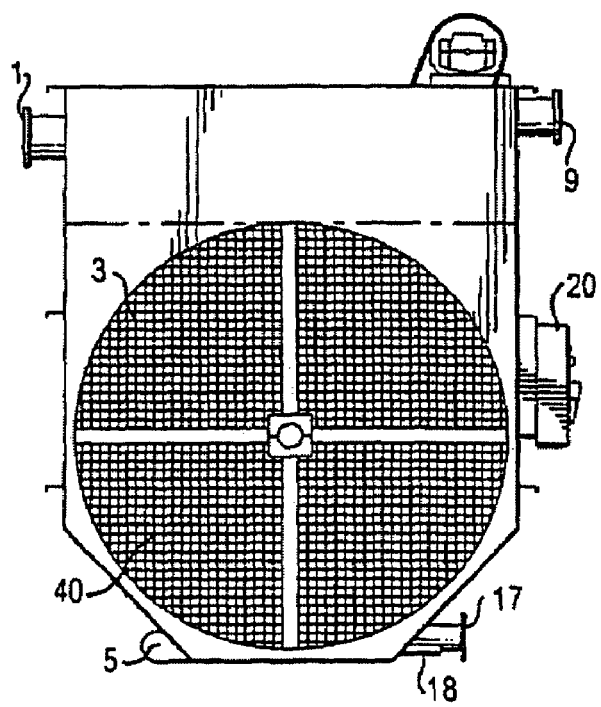
FIG. 5 illustrates a section view along line A-A in FIG. 4.
Figure 14A:
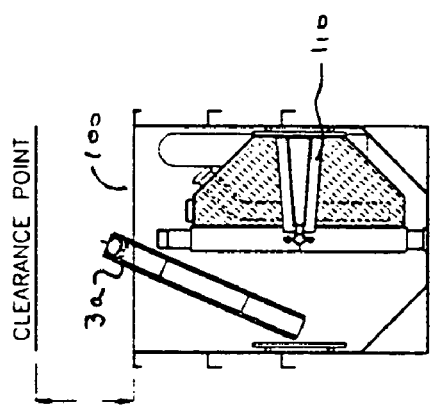
FIGS. 14(a)-(f) show a sequence of removing the modular filter assembly of FIG. 13 from its position within a tank.
Figure 14B:
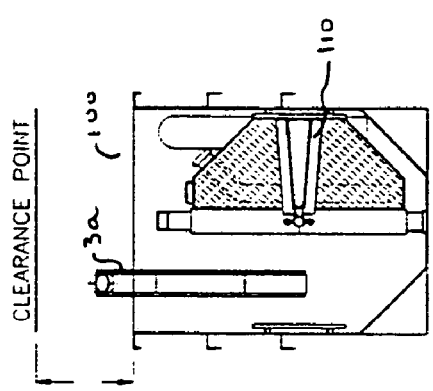
Figure 14C:
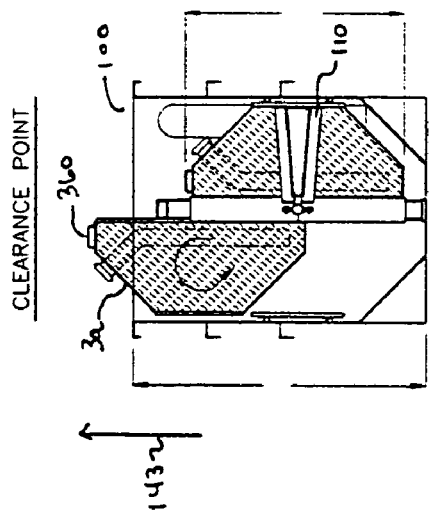
Figure 14D:
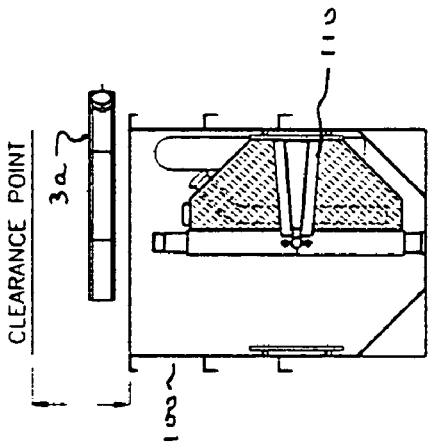
Figure 14E:
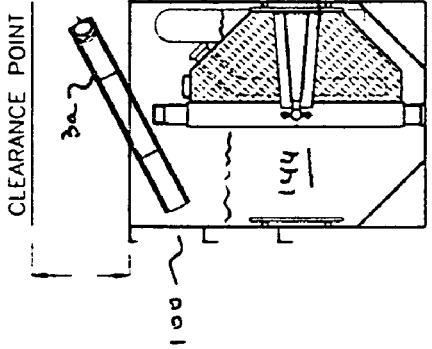
Figure 14F:
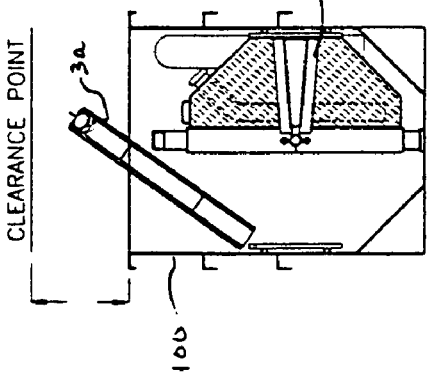
Figure 18:
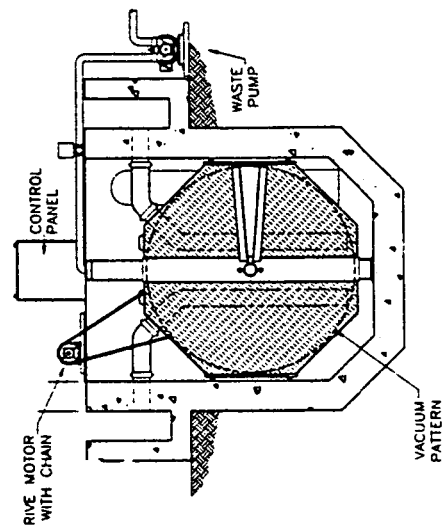
FIG. 18 is a section view of FIG. 17 along lines 18-18.

In the embodiment, as shown in FIGS. 4 and 5, each of filter assemblies 3A and 3B is a divider between dirty liquid chamber 2 and clean liquid chambers 4 and 6. Filter assemblies 3A and 3B comprises four grid backing plates 40 generally arranged in a circular configuration divided into four quadrants. Each backing plate 40 is removable separately from the filter apparatus to allow changing of the plates. Backing plates 40 are preferably made of a material selected from the group of plastic and metal, such as polypropylene or stainless steel.

Although my earlier application disclosed that a filter 41 is located on the inside of each grid backing plate 40, where the filter, in conjunction with a backing plate removes solids from the liquid passing from dirty liquid chamber 2 to clean liquid chambers 4 and 6, the present invention is also directed to modular embodiments of filter assemblies (FIGS. 12a-12d and 13a-13d) where the filter cloth 3a is placed on the outside, and opposing surfaces of grid 142 to create a "clean" chamber between such opposed filter cloths. Filter 141 is preferably a cloth media that is stretched over the surface of grid backing plate 142. It may be made of a cloth polypropylene felt or a pile supported by a foraminous backing. It preferably comprises apertures of about 10 microns in width. However, any filter media capable of filtering out a desired solid may be used.

Figure 24A:
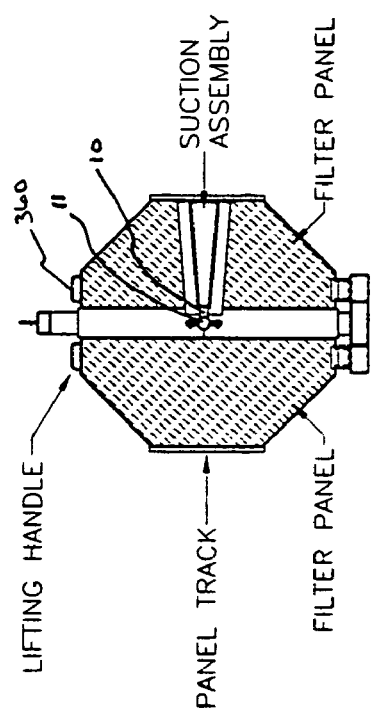
FIG. 24a is similar to FIG. 24, but showing the suction assembly installed.

The structure of each removable grid backing plate 142 (FIG. 23) having an associated filter 141 mounted thereon is shown in FIG. 24. Each grid backing plate basically is a structural framework having filter 141 applied to a surface thereof. The combination removes desired solids from the dirty liquid.

After extended use of the apparatus, the solids filtered out of the dirty liquid by filters 141 begin to accumulate, causing the filter to become clogged. To remove excessive solids, the apparatus is provided with a wash assembly 110. Wash assembly 110 comprises a wash arm mounted on an axle 11. The wash arm 10 is placed into near contact with filter assembly 3 and are used to wash filters 141 of such accumulated solids by either vacuuming and/or rinsing. In order for the wash arm 10 to clean the entire surface of filters 141, the wash arm rotates about axle 11 covering the area between an inner circumference 305 and an outer periphery 307 (shown in FIGS. 15 and 22). As such, wash arm 10 is mounted on axle 11 and is in fluid connection allowing for vacuum and rinsing forces to pass from filter cloth 141 through faceplate 203 into vacuum head 220.

The filter media to be placed on grid 142 is preferably a pile fabric that is stretched over grid 142 and, preferably, attached at points intermediate its periphery to grid backing plate 142. Preferably, the filter media is made of an inert material, such as a polymer, preferably polypropylene, supported by a foraminous backing, such as a woven or non-woven fabric. The fiber bundles making up the filter media and attached to the woven or non-woven fabric can be up to 15 mm in length, although it is within the scope of the invention to use larger or shorter lengths provided that they do not substantially contact a suction head as will be described below. Suitable filter media are described in U.S. Pat. No. 6,103,132 and Netherlands Patent No. 8103750, both incorporated herein by reference in their entireties.

Figure 19:
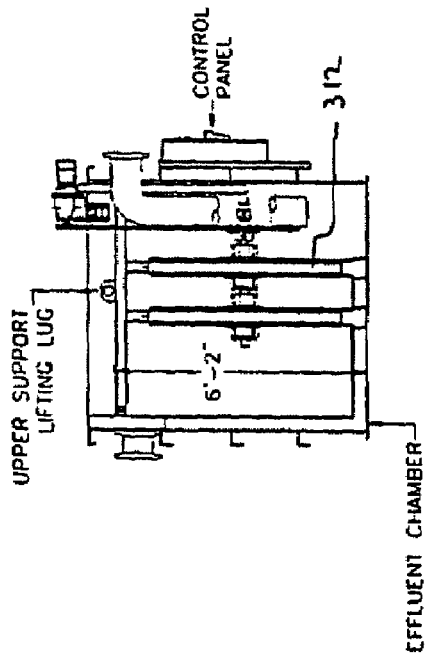

In the embodiments illustrated in FIGS. 12-13, the filter media 141, together with a supporting framework 142 may be formed into modular assemblies with a filter media (fiber side out) placed across opposite sides of the framework to form a modular filter assembly. In use, the dirty water, i.e., water containing suspended solids, is exterior of the modular filter assembly 3a, with the space bounded by the interior of the fabric backing and framework constituting the clean (filtered) water chamber 312 (FIG. 19). The chamber 312 may be provided with at least one of a bottom outlet 313 (FIG. 13b) or a top outlet 314 (FIG. 12a), to extract the clean water from the chamber 312. As with the embodiment of FIG. 5, the modular assemblies of FIGS. 12-13 can also incorporate a grid backing plate 142, optionally attached to framework 315.

The pile filter media of the present invention is, to some extent, caused to "lay flat" by the flow of effluent from the dirty to the clean (filtered) chamber.

The novel suction head 200 (shown generally in FIGS. 6-11) comprises a faceplate 203, and a suction section 220 connected by one or more conduits 201-202, to a source of subchamber (vacuum) pressure. As shown in FIGS. 8, 10 and 11, faceplate 203 is spaced away from the filter cloth 208, such that substantially no fibers, when in their extended and erect position, are drawn into contact with faceplate 203. In some instances, the woven or non-woven fiber backing will be drawn away (not shown) from grid backing plate 142 in a direction towards faceplate 203. In such instances, the suction head 220 can be provided with adjustment means (not shown) such as threaded fasteners, which will permit the suction head 220 to be relatively movable towards, or away from, the filter media, so as to prevent contact with or application of mechanical pressure of either the face plate 203 or suction head 220 on the filter media 208.

Though, not wishing to be limited to the following mechanism, it is believed that the fluid flow, generally parallel to faceplate 203 (as depicted in the enlarged view of FIG. 11) creates a fluid (not mechanical force) between the extensions 210, 212 of faceplate 203 and the individual fiber bundles 314, 315 of filter media 208 causing the fiber bundles to release entrained or occluded solids when the flow changes from generally parallel flow (depicted by arrows 215-216) to generally perpendicular flow (depicted by arrows 217) as the apertures (collectively 214) in faceplate 203 lie over the fiber bundles 314. As depicted schematically in FIG. 11, this change in flow dislodges the occluded solids from between and within the fiber bundles of the filter media 208, permitting the particulates to enter the suction head through apertures 214 and be removed through one or more vacuum conduits 201-202. The apertures 214 may be made of circular holes by drilling, boring, casting into, or otherwise when forming faceplate 203. Faceplate 203 is preferably made of a material with no sharp edges, and can be formed of metals, including stainless steel, polymers or ceramics, although other materials, especially composites are suitable. The vacuum head assembly 200, and especially suction head 220 is preferably made of metal, such as stainless steel, though other materials of construction similar to faceplate 203 are acceptable.

Figure 17:
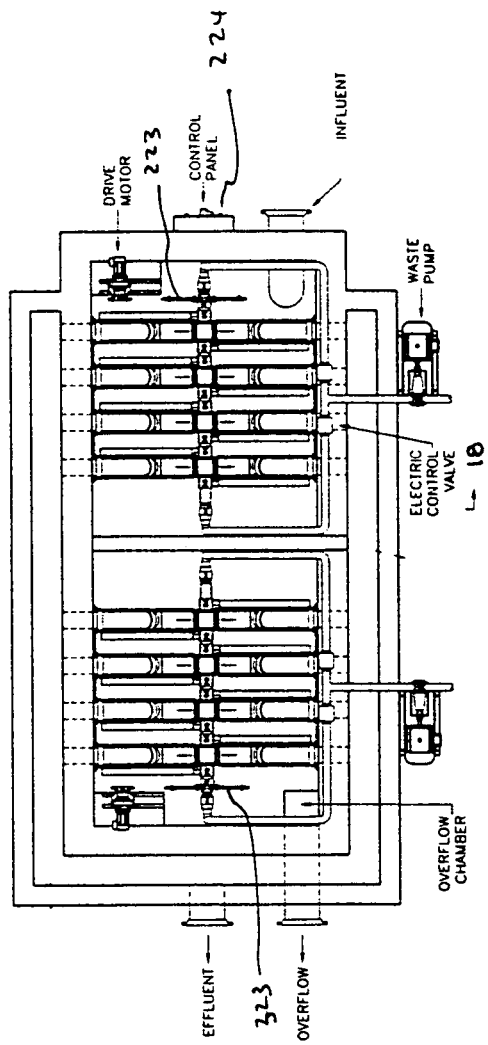
FIG. 17 is a top view of the filter of FIG. 16.
Figure 16:
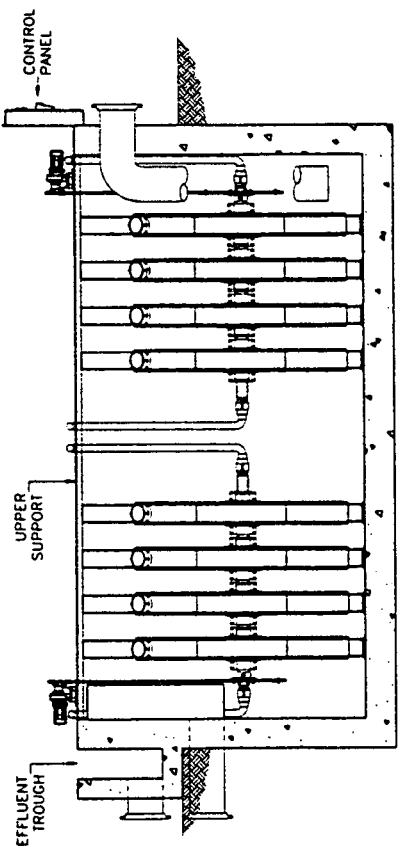
FIG. 16 is a sectional view of an embodiment wherein multiple modular filter assemblies of FIG. 12a can be used to increase the filtering capacity of a given tank.
Figure 21:
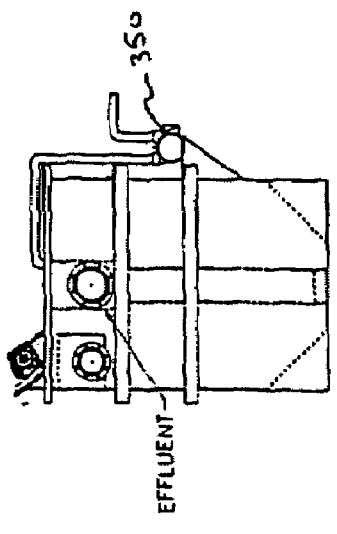
FIGS. 19, 20 and 21 are similar to FIGS. 16, 17 and 18, respectively, but shown with a lesser number of modular units.
Figure 22:
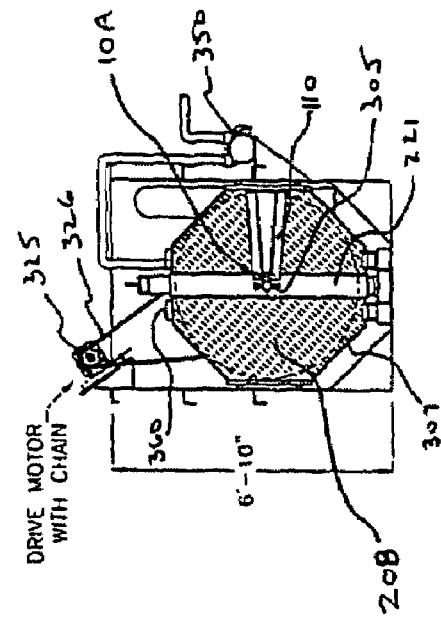
FIG. 22 is a section along lines 22-22 of FIG. 20.
Figure 20:
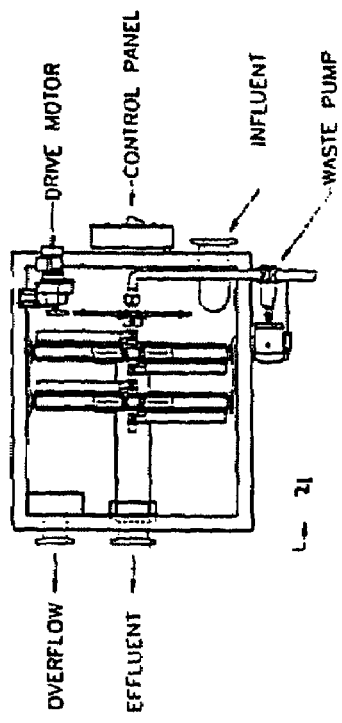

Vacuum head assembly 200 is preferably mounted for rotation in relation to a fixed filter media, such as shown in FIG. 21 or 22. At least one vacuum head assembly 200 can be mounted on an axle attached to a post 221 (FIGS. 15, 22) so as to be rotatable relative to filter media 208 (FIG. 22). Suitably moved by a motor 325 and transmission device, e.g., chain 326 engaging sprocket 223, 323 (FIG. 16) the vacuum head assemblies 200 traverse the filter media 208 in continuous or discontinuous fashion. Alternative transmission devices include toothed belts and sprockets, directly meshing gears, rack and pinion drives, hydraulic motors and pumps, and other suitable transmission means known to those skilled in the art. In a most preferred embodiment, the travel of the vacuum head assemblies 200 is controlled by function of control panel 224 (FIG. 17) by either preset timer, or by monitoring means on one or more of throughput of effluent across the filter media, particulate contents of the cleaned (filtered) or dirty effluent or other process parameter such as rate of flow of effluent into (or out of) apparatus 100; pressure drop across the filter media, height of dirty water in the tank, etc. In a most preferred embodiment, the vacuum head assembly 200 traverses in a first (e.g., clockwise) direction and a second opposite (e.g., counterclockwise) direction between various cleaning cycles, most preferably alternate cleaning cycles.

Such a sequence not only increases the efficiency of cleaning the filter media (3*a*), but is also thought to decrease the stress on the individual fibers comprising the fiber bundles of such media.

Although the filter media 3A can be placed on grid backing assemblies 40 (FIG. 5), which separate a tank into dirty liquid chamber 2 and one or more clean liquid chambers 4 and 6 (FIG. 4), the more preferred embodiment is to formulate two filter media on opposite sides of a framework 225 (FIGS. 12*a-d* and 13*a-d*) to form the modular filter assembly 226, 227.

Such modular filter assemblies 226, 227 provide a clean (filtered) chamber 312 bonded by the framework 225 and the filter media 3*a*. If filter media 3*a* eventually needs to be replaced, not only would the tank not have to be drained and put out of commission, but one or more modular assemblies 226, 227 could be removed leaving the remaining modular assemblies in place and continuing to filter the dirty effluent in the single tank (FIGS. 16-21). So too, this modular assembly permits increasing the filtering capacity of a single tank, e.g., such as occasioned at a later time when the demands on filtering increase, by merely inserting one or more additional modular assemblies 226, 227 into the same tank, e.g., compare FIGS. 19-20 with FIGS. 16-17.

As is apparent, modular assembly 227 has a lower outlet while modular assembly 226 has an upper outlet. It is readily apparent to those skilled in the art to whom this disclosure is directed that the modular assembly 227 having the lower outlet is depicted in an embodiment illustrated in FIGS. 13*a*-13*d* (with connections to outlet best shown in FIG. 19), where the modular assembly 226 is depicted in FIGS. 12*a*-12*d* and 18 (with connections to outlets best shown in FIG. 16).

As described in my earlier applications, the filter media may be inserted into tracks or channels to position and secure the filter media within its respective tank. The same type of positioning can be achieved with modular assemblies 226, 227 as shown, for example, in FIG. 15. Therein, the modular assemblies 227 of the lower (or upper outlet-not shown) configurations can be installed between outer racks and post 221 (FIG. 15, 15*a*). Post 221 (shown in enlarged view in FIG. 15*a*) may comprise a rectangular tubing 233 to which are mounted first and second plates 234, 235. These plates 234, 235 receive a right and left frame rail (236, 237, respectively) of modular assemblies 227, 227' to position these assemblies relative to each other; the tank and vacuum head assemblies 200 (not shown in FIGS. 15-15*a*). However, the dotted line in FIG. 15 depicts the vacuum head assembly 200 areas of rotation relative to the filter media 208 on each of modular assemblies 227, 227'. Further details of the mounting tracks can be seen in FIG. 15*b*. However, these details are exemplary only and those of ordinary skill in the art will readily envision other mounting systems without departing from the spirit or scope of the invention.

The vacuum head of the invention is powered by a pump 350 (FIGS. 21-22) and, although it has been suggested to use a positive displacement pump in other apparatus having vacuum cleaning system as a source of vacuum, when the suction head is in direct contact with the filter media (See, U.S. Pat. No. 6,090,298 (herein incorporated by reference in its entirety)), I have found that suitable efficiencies can be obtained with a centrifugal pump as the source of vacuum to the vacuum head assemblies 200 of the invention when positioned not in contact with the fiber bundles of the filer media according to my foregoing description.

In use, the filter system of my invention may be fabricated completely at a factory site, i.e., where the tank and all components are assembled together ready for shipment. Alternatively, my apparatus may be used in tanks formed in situ, or even to retrofit existing filter apparatus by removal of the rotating filters of the aforementioned U.S. Pat. Nos. 6,090,298 and 6,103,132 and inserting the modular components disclosed herein. Tracks can be provided on at least one of the tank, the modular components or filter media disclosed herein, or on both. The static positioning of the filter media in use removes the mass, and, hence, the energy necessary to rotate the mass, of prior art filtering devices. Moreover, the use of tracks or other similar mounting means permits the filters to be pulled from the tank by lifting hooks 360 as discussed, without either draining of the tank or discontinuance of the filtering process by the remaining filters. As there is no rotating filter mass within the tank, there is no need for seals, which as aforementioned, is a source of leakage in the prior art.

Furthermore, the type of suction head described herein applies uniform suction per unit area to the filter media, does not exert mechanical pressure upon or cause wear of the filter media, including filter backing, and, thus, does not cause premature failure, or diminished efficiency of the filter media as in the prior art.

Lastly, the alternative of applying suction in alternate directions is not possible in the prior art devices, as the leading edge is specifically constructed to apply mechanical pressure to the filter in order to make sure the apparatus is functional. Modification of this leading edge (as well as a trailing edge) to not contact the filter media has never been considered in the above-described prior art.

Furthermore, fabrication of the filter media into sub-assemblies or modular components is readily accomplished at a factory, permitting the operator of a wastewater treatment plant, to maintain one or more of such filters on hand to readily interchange the filter (or modular components) without draining the tank, with little or no reduction of efficiency of the tank, and in the multiple modular component embodiment can maintain high throughout, while the other remaining components can be continuously filtering.

EXAMPLE

The method of backwashing a stranded fiber filter media is flow reversal, i.e., a flow direction that is countercurrent to that of the flow during the filtering operation, as well as a horizontal surface scouring. Influent enters the filter through a pipe that directs the flow toward the floor of the filter. This approach uses the energy of the incoming flow to minimize settling of solids within the filter tank. The suspended solids will be removed from the flow as the influent passes through the filter media. The accumulation of solids on the media will begin to restrict the flow of fluid through the media causing the level within the filter tank to rise. When the level reaches a predetermined set point, the backwashing of the media will commence. A centrifugal pump draws fluid into the collection manifold causing the flow through the filter media to reverse and become countercurrent in the vicinity of the manifold. Flow is also generated that is horizontal to the stranded fiber as the flow is directed beneath the collection manifold. This combination of countercurrent and horizontal flow will cause the solids that have accumulated on the stranded fiber filter media to dislodge and be swept into the manifold for disposal. A drive motor that moves the manifold also engages at this time, moving the manifold past the media and collecting solids as the media is traversed. The movement of the manifold can be Bi-directional. The media is gradually exposed to an increase in the velocity of the reversing and horizontal flows until it is directly beneath the manifold, where the full effect of the combined flows remove the majority of the solids from the media. The manifold is designed so that it does not mechanically compress the media or hold it in place while traversing the filter media. This key design feature will assure maximum life of the stranded fiber filter media, as it is located above the surface and will not wear or tear the media.

It is readily apparent to those skilled in the art to which this disclose is directed to modify the invention without departing from the spirit and scope of the invention.

I claim:

1. A method of operating a filter apparatus including a backwashing of a pile filter media comprising:

providing a pile filter media comprised of a plurality of fiber bundles on a fabric backing;

flowing effluent containing entrained solids through the pile filter media in a first direction between the fiber bundles and then through the fabric backing causing the fiber bundles of said filter media to lay flat;

backwashing said pile fabric with a suction assembly comprising a suction head and an adjacent faceplate; wherein said suction head and said adjacent faceplate are spaced from said filter media by a distance such that the fibers of the fiber bundle, even when in their extended and erect position, is such that substantially no fibers are drawn into contact with the suction head and faceplate such that the suction assembly does not exert mechanical pressure on said filter media;

said backwashing further comprising first flowing dirty effluent between said faceplate and the laid flat filter media in a position beneath, and in a direction parallel to, said faceplate and thereafter creating a second flow direction by exposing the fiber bundles to said suction head thereby causing said fiber bundles to stand erect thereby releasing entrained solids on, and between, said fiber bundles to be carried away from the fiber bundles in a direction perpendicular to said first flowing direction; and further comprising rotating said suction head about a horizontal axis over substantially the entire surface of said filter media.

2. The method of claim 1, including providing said suction head with a plurality of apertures arranged in rows to exert suction on discrete portions of said filter media simultaneously.

3. The method of claim 2, including arranging the apertures on the suction head in a configuration such that more apertures are present distal from a point of rotation of the suction head than proximate said point of rotation.

4. The method of claim 1, wherein the rotating alternates between at least one clockwise and one counterclockwise direction.

5. The method of claim 1, further comprising controlling the rotation in response to a control panel.

\* \* \* \* \*